(12) United States Patent
Shi et al.

(10) Patent No.: US 10,120,175 B2
(45) Date of Patent: Nov. 6, 2018

(54) OPTICAL MODULE, OPTICAL DEVICE AND WEARABLE DISPLAY DEVICE

(71) Applicant: SHENZHEN ROYOLE TECHNOLOGIES CO. LTD., Shenzhen (CN)

(72) Inventors: Hongyan Shi, Shenzhen (CN); Songling Yang, Shenzhen (CN)

(73) Assignee: SHENZHEN ROYOLE TECHNOLOGIES CO. LTD., Shenzhen, Guangdong (CN)

( * ) Notice: Subject to any disclaimer, the term of this patent is extended or adjusted under 35 U.S.C. 154(b) by 405 days.

(21) Appl. No.: 15/058,901

(22) Filed: Mar. 2, 2016

(65) Prior Publication Data
US 2017/0075096 A1    Mar. 16, 2017

Related U.S. Application Data

(63) Continuation of application No. PCT/CN2015/089484, filed on Sep. 13, 2015.

(51) Int. Cl.
*G02B 27/02* (2006.01)
*G02B 15/14* (2006.01)
(Continued)

(52) U.S. Cl.
CPC .............. *G02B 17/08* (2013.01); *G02B 3/04* (2013.01); *G02B 9/34* (2013.01); *G02B 17/086* (2013.01);
(Continued)

(58) Field of Classification Search
CPC ........ G02B 17/08; G02B 17/086; G02B 3/04; G02B 9/34; G02B 27/0081;
(Continued)

(56) References Cited

U.S. PATENT DOCUMENTS 9,952,435 B2 * 4/2018 Tanaka ............... G02B 27/0172
2005/0046954 A1 3/2005 Achtner

FOREIGN PATENT DOCUMENTS

| CN | 1335529 A | 2/2002 |
|---|---|---|
| CN | 1664649 A | 9/2005 |

(Continued)

OTHER PUBLICATIONS

Shenzhen Royole Technologies Co., Ltd., International Search Report and Written Opinion, PCT/CN2015/089484, dated May 31, 2016, 7 pgs.

*Primary Examiner* — Collin X Beatty
(74) *Attorney, Agent, or Firm* — Morgan, Lewis & Bockius LLP

(57) ABSTRACT

The present application relates to an optical module, an optical device and a wearable display device. The wearable display device includes: a miniature display module, configured to output a display source; the optical module, configured to magnify the display source and project the display source to an exit pupil. The optical module includes: a first optical unit, including a first lens having a positive focal length, a second lens having a negative focal length, and a third lens having a positive focal length, the three lens being sequentially arranged along an optical path of the first optical unit; and a second optical unit, including a fourth optical element having a positive focal length, the fourth optical element including a first aspheric surface, a second aspheric surface and a reflection surface, the reflection surface changing a direction of the optical path of the first optical unit towards an exit pupil.

28 Claims, 7 Drawing Sheets

(51) Int. Cl.
*G02B 17/08* (2006.01)
*G02B 3/04* (2006.01)
*G02B 9/34* (2006.01)
*G02B 27/00* (2006.01)
*G02B 27/01* (2006.01)

(52) U.S. Cl.
CPC ..... *G02B 27/0025* (2013.01); *G02B 27/0081* (2013.01); *G02B 27/0172* (2013.01); *G02B 2027/0134* (2013.01)

(58) Field of Classification Search
CPC ............ G02B 27/0025; G02B 27/0172; G02B 27/017; G02B 2027/0134; G02B 2027/011; G02B 2027/0178; G02B 2027/0132; G02B 15/173; G09G 3/002
USPC ................................................ 359/482, 687
See application file for complete search history.

(56) References Cited

FOREIGN PATENT DOCUMENTS

| | | | |
|---|---|---|---|
| CN | 101424788 A | 5/2009 |
| CN | 103492925 A | 1/2014 |
| CN | 103988111 A | 8/2014 |
| CN | 104204904 A | 12/2014 |
| CN | 104423044 A | 3/2015 |
| CN | 104793337 A | 7/2015 |

* cited by examiner

OPTICAL MODULE, OPTICAL DEVICE AND WEARABLE DISPLAY DEVICE

RELATED APPLICATION

This application is a continuation application of PCT Patent Application No. PCT/CN2015/089484, entitled "OPTICAL MODULE, OPTICAL DEVICE AND WEARABLE DISPLAY DEVICE" filed on Sep. 13, 2015, which is incorporated by reference in its entirety.

TECHNICAL FIELD

The present application relates to optical display field, and particularly relates to an optical module suitable for a near-eye display, an optical device having the optical module, and a wearable display device having the optical module or the optical device.

BACKGROUND

At present, wearable display device can be divided into transmission type and immersion type. The immersion type of wearable display device focuses on immersion of visual experience, including providing users private cinema experience of high quality effect, authenticity of entertainment experience of the virtual scene, etc. As a result, whatever field the immersion type is applied, high display quality is still required.

For available technologies and products, in order to achieve better display quality, such as demands of large field of view and high resolution, one way is by increasing linear field of view, reducing magnification degrees of optical module, to reduce display problems such as distortion, to achieve relative balance of display quality. But in this way, the size of the display needs to be increased correspondingly, which will result in increase of the volume and weight of the front portion of the wearable display device. For the users, poor portability and heavy wearing burden of the wearable display device will result in poor experience and feeling. Another way is to use small size display, for the sake of the demand of the large field of view, it needs to increase a plurality of lenses to increase the magnification degrees of the display module. Due to the higher magnification, the more serious the problem of distortion is, therefore, it needs to add functional lenses to modify the problem of distortion, which will result in relative complication of the optical module, as well as increase of the volume and weight of the front portion.

Therefore, an optical module with comparable simplified structure and optimal display quality is required.

SUMMARY

Embodiments of the present application provide an optical module, an optical device and a wearable display device to overcome the problems in the aforesaid background.

The present application provides a wearable display device, including:
a miniature display module, configured to output a display source; and
an optical module, configured to magnify the display source and project the display source to an exit pupil, including:
a first optical unit, including a first lens having a positive focal length, a second lens having a negative focal length, and a third lens having a positive focal length, the first lens, the second lens and the third lens are sequentially arranged along an optical path of the first optical unit and away from the display source; and
a second optical unit, including a fourth optical element having a positive focal length, the fourth optical element including a first aspheric surface, a second aspheric surface and a reflection surface, the reflection surface being configured to change a direction of an optical path of the first optical unit to a direction of the exit pupil.

The present application further provides an optical device, including an optical module, the optical module including:
a first optical unit, including a first lens having a positive focal length, a second lens having a negative focal length, and a third lens having a positive focal length, the first lens, the second lens and the third lens are sequentially arranged along an optical path of the first optical unit and away from the display source; and
a second optical unit, including a fourth optical element having a positive focal length, the fourth optical element including a first aspheric surface, a second aspheric surface and a reflection surface, the reflection surface being configured to change a direction of the optical path of the first optical unit to a direction of an exit pupil.

The present application further provides a wearable display device, including the aforesaid optical device and a miniature display module; the miniature display module is configured to provide display source; and the optical module of the optical device is configured to project magnified virtual images of the display source to the exit pupil.

The optical module of the embodiments of the present application includes a set of sequentially arranged first lens having a positive focal length, second lens having a negative focal length, third lens having a positive focal length, and fourth optical element having a positive focal length, the fourth optical element including the first aspheric surface, the second aspheric surface and the reflection surface, thereby to change the direction of the optical path of the first optical unit to the direction of the exit pupil by the reflection surface. The first optical unit cooperates with the second optical unit including the first aspheric surface and the second aspheric surface to correct aberration, to realize high quality display images by using a limited number of optical elements.

BRIEF DESCRIPTION OF THE DRAWINGS

The following figures are used for in combination with embodiments to illustrate embodiments of the present application in detail. It should be understood that, components shown in the figures do not represent the actual size and the proportional relationship, they are only schematic for clear illustration, and should not be understood as limitation to the present application.

DETAILED DESCRIPTION

In order to more clear purpose, technology program and advantages of the present application, the present application is further specified in combination with a plurality of embodiments and the drawings. It should be understood that, the following described specific embodiments are only used for explaining, not limiting the present application.

Figure 1:
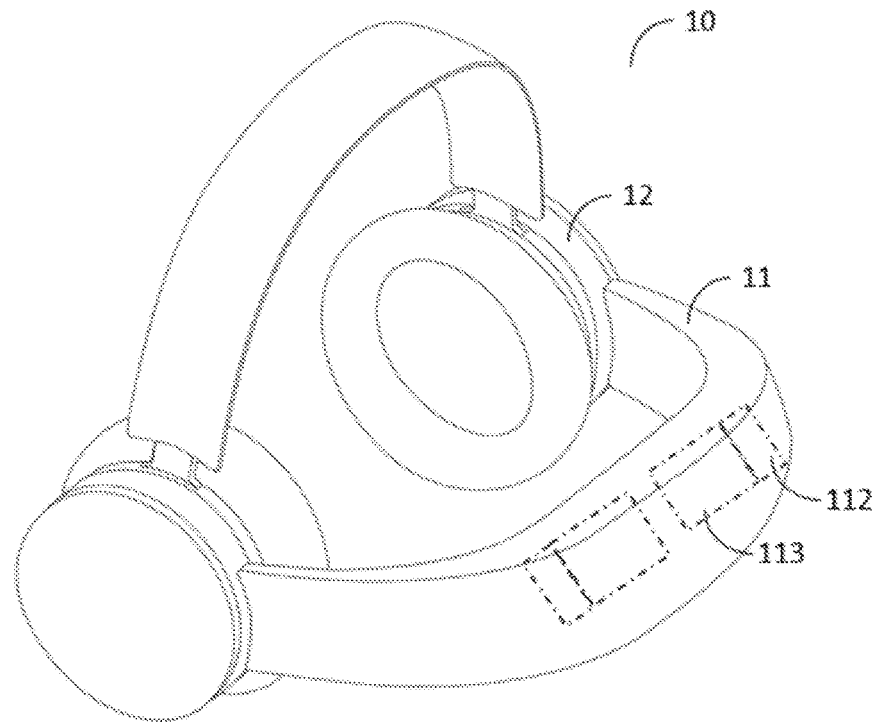
FIG. 1 is a diagrammatic view of a wearable display device in accordance with an embodiment of the present application.
Figure 2:
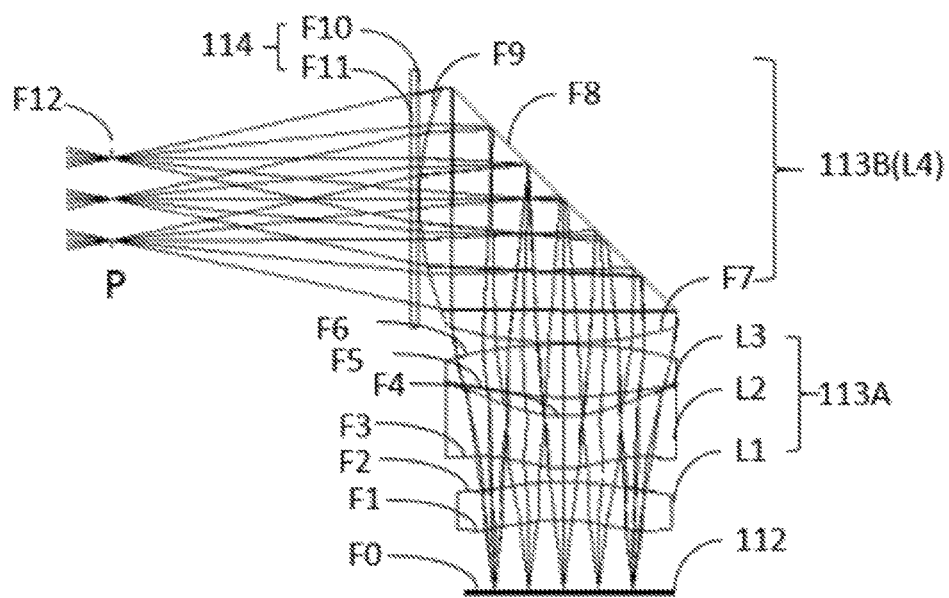
FIG. 2 is a diagrammatic view of an optical module of an embodiment of the present application.
Figure 6:
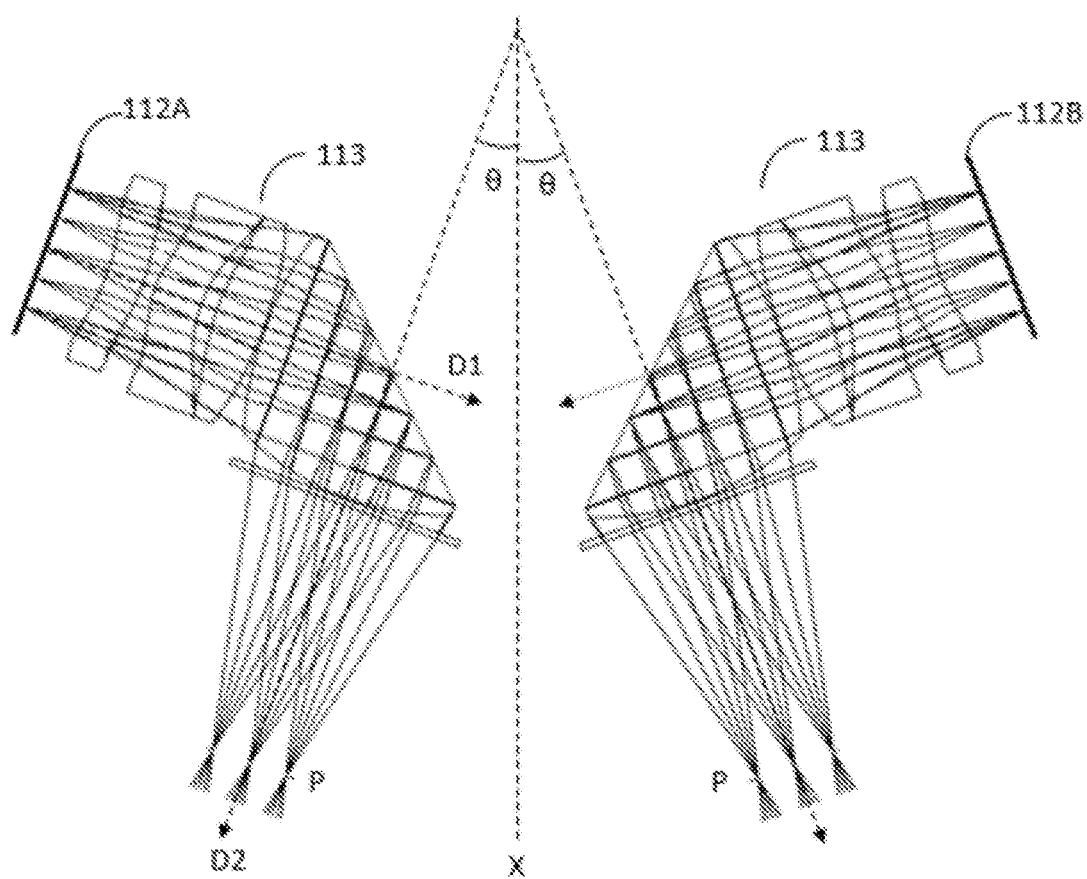
FIG. 6 is a diagrammatic view of an optical principle of an embodiment of the present application.

FIG. 1 illustrates a wearable display device 10 of a first embodiment of the present application. In order to understand a principle of the present application, the illustrated embodiment provides an exemplary structure in combination with the description of a wearable display device, but the present application is not limited to the exemplary structure. With reference to FIG. 1, FIG. 2 and FIG. 6, the wearable display device 10 includes a display device 11 and a headphone 12 extending from two ends of the display device 11, respectively. When the wearable display device 10 is worn by a user, the display device 11 is positioned in front of eyes of the user, to provide the near-eye display, the headphone 12 is put on the ears of the user, to provide audio output. The display device 11 includes two viewing windows (not shown) at an inner side thereof towards the user, a miniature display module 112 and an optical module 113 both located inside the display device 11. The miniature display module 112 is configured to output a display source, the optical module 113 is configured to magnify the display source and project the display source to an exit pupil. In the illustrated embodiment, the miniature display module 112 includes two miniature displays 112A, 112B, the miniature display module 112 can be an organic light-emitting diode (OLED) display, a liquid crystal display (LCD), however a type of the miniature display module 112 is not limited in the present application. Correspondingly, the wearable display device 10 include two sets of the optical modules 113, therefore, the two sets of the optical modules 113 respectively project light of the display sources provided by the corresponding miniature displays 112A, 112B to the two eyes of the user, i.e., the exit pupils P, via the two viewing windows, to let the user see magnified virtual images.

Also referring to the principle view of the optical module 113 and the miniature display module shown in FIG. 2, the optical module 113 includes a first optical unit 113A and a second optical unit 113B. The first optical unit 113A includes a first lens L1 having a positive focal length, a second lens L2 having a negative focal length, and a third lens L3 having a positive focal length. The first lens L1, the second lens L2 and the second lens L3 are sequentially arranged along an optical path of the first optical unit 113A and away from the display source. The second optical unit 113B includes a fourth optical element L4 which includes a first aspheric surface F7, a second aspheric surface F9 and a reflection surface F8, wherein the reflection surface F8 is configured to change a direction of the optical path of the first optical unit 113A to a direction of the exit pupil.

The fourth optical element L4 includes but not limited to an integrally made prism constructed by the first aspheric surface F7, the second aspheric surface F9 and the reflection surface F8, or a lens having the first aspheric surface F7, a lens having the second aspheric surface F9 and a reflector having the reflection surface F8. Based on the principle, any reasonable change of the specific configuration of the fourth optical element made by the skilled person in the field without creative work, still belongs to the protective scope of the present application.

In the illustrated embodiment, the first lens L1 of each set of optical module 113 is arranged adjacent to the display source, the second lens L2, the third lens L3 and the fourth optical element L4 are sequentially arranged along an optical path of the first optical unit 113A behind the first lens L1, along a direction away from the display source. Specifically, FIG. 6 illustrates that the two sets of optical modules 113 and the corresponding miniature displays 112A, 112B are axis-symmetrical relative to the axis X. In the illustrated embodiment, sides of the miniature displays 112A, 112B providing the display source are arranged opposing to each other, to define a central axis X between the miniature displays 112A, 112B. The first lens L1, the second lens L2, the third lens L3 and the fourth optical element L4 of each set of the optical module 113 are sequentially arranged between the miniature display 112A or 112B and the central axis X. The first aspheric surface F7 of the fourth optical element L4 faces the third lens L3, the second aspheric surface F9 faces the exit pupil P. Each of the first lens L1, the second lens L2, the third lens L3 and the fourth optical element L4 has an optical center, the optical centers are coaxial with an optical axis of the optical module 113. Each of the first lens L1, the second lens L2 and the third lens L3 has a plurality of optical surfaces, and the optical surfaces are all rotationally symmetrical relative to the optical axis of the optical module 113. Specifically, each of the first lens L1, the second lens L2, and the third lens L3 includes a pair of optical surfaces F1 and F2, F3 and F4, F5 and F6, along a direction from a position adjacent to the display source towards the central axis X. Preferably, each of the optical surfaces is aspheric.

The combination of the first optical unit 113A provided by the illustrated embodiment, can be configured to correct spherical aberration, astigmatism, field curvature and image distortion. It can be understood that, in other embodiments, when at least three of the optical surfaces F1, F2, F3, F4, F5 and F6 are aspheric surfaces, the first optical unit 113A, under a limited number of combined lenses, can mutually compensate with the second optical unit 113B to correct the aberration.

As a preferred embodiment, the second optical unit 113B has a protecting lens 114 arranged at a light exiting side, to protect the lenses of the optical module 113. The protecting lens 114 can use any optical material with high light transmittance. The protecting lens 114 includes a hard film of anti-fingerprint and anti-scratch coated on a surface thereof. Specifically, the protecting lens 114 includes an optical surface F10 facing the second aspheric surface F9 and an optical surface F11 facing the exit pupil P.

Preferably, the second lens L2 has a dispersion coefficient less than that of each of the fourth optical element L4 and the third lens L3, and a difference between the coefficient of the second lens L2 and that of the fourth optical element L4 and the third lens L3 is large, which can be used to eliminate the lateral chromatic aberration.

According to an expression formula of aspheric surface:

$$Z(s) = \frac{Cs^2}{1 + \sqrt{1 - (1+k)C^2 s^2}} + A_4 s^4 + A_6 s^6 + A_8 s^8 + \ldots \tag{1}$$

wherein, Z represents rotation axis of symmetry, s represents radial distance, C represents radian (inverse of curvature radius), k represents spherical surface constant (K=0, spherical surface; K>-1, ellipsoid; K=-1, paraboloid; K<-1, hyperboloid), A4, A6 and A8 represent high order aspheric coefficients.

For the aforesaid optical module setting, assuming that the optical module 113 has a focal length f, the first lens has a focal length f1, the second lens has a focal length f2, the third lens has a focal length f3, the fourth optical element has a focal length f4, relationships therebetween are: $2f<f1<12f$, $-1.1f<f2\leq-0.4f$, $0.4f<f3<4.5f$, and $0.7f<f4<1.5f$.

The display source, projected through the optical module 113 to the exit pupil P, has an optical path length O including: a first distance O1 that the display source is projected through the first optical module 113A to the reflection surface F8, and a second distance O2 that the display source is projected from the reflection surface F8 to the exit pupil P, wherein, a relationship among the optical path length O, the first distance O1 and the second distance O2 is: $0.8f<O1<1.6f$, $0.6f<O2<1.8f$, and $1.2f<O<3.4f$.

Figure 3:
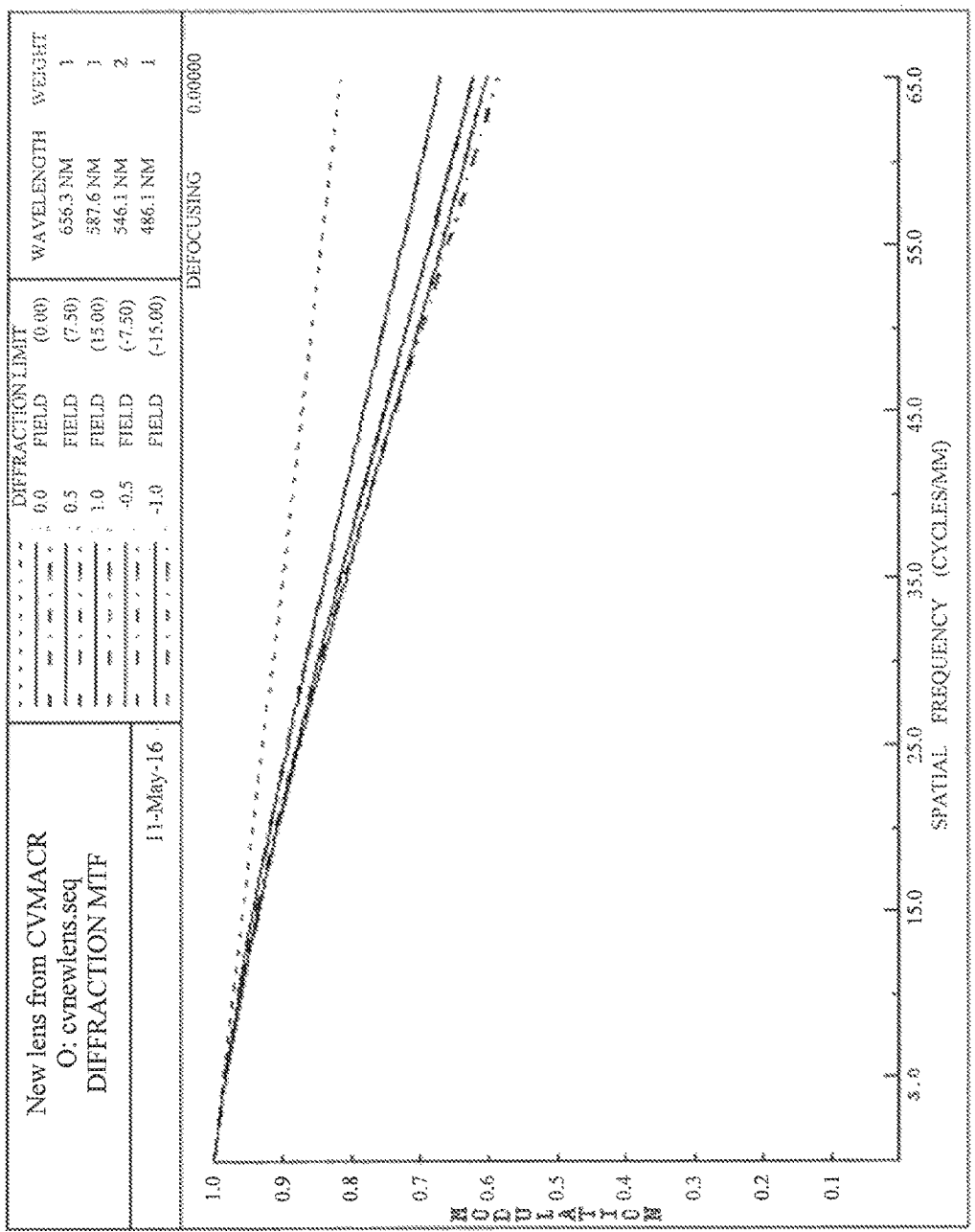
FIG. 3 shows a curve of a modulation transfer function according to the embodiment of FIG. 2.
Figure 4:
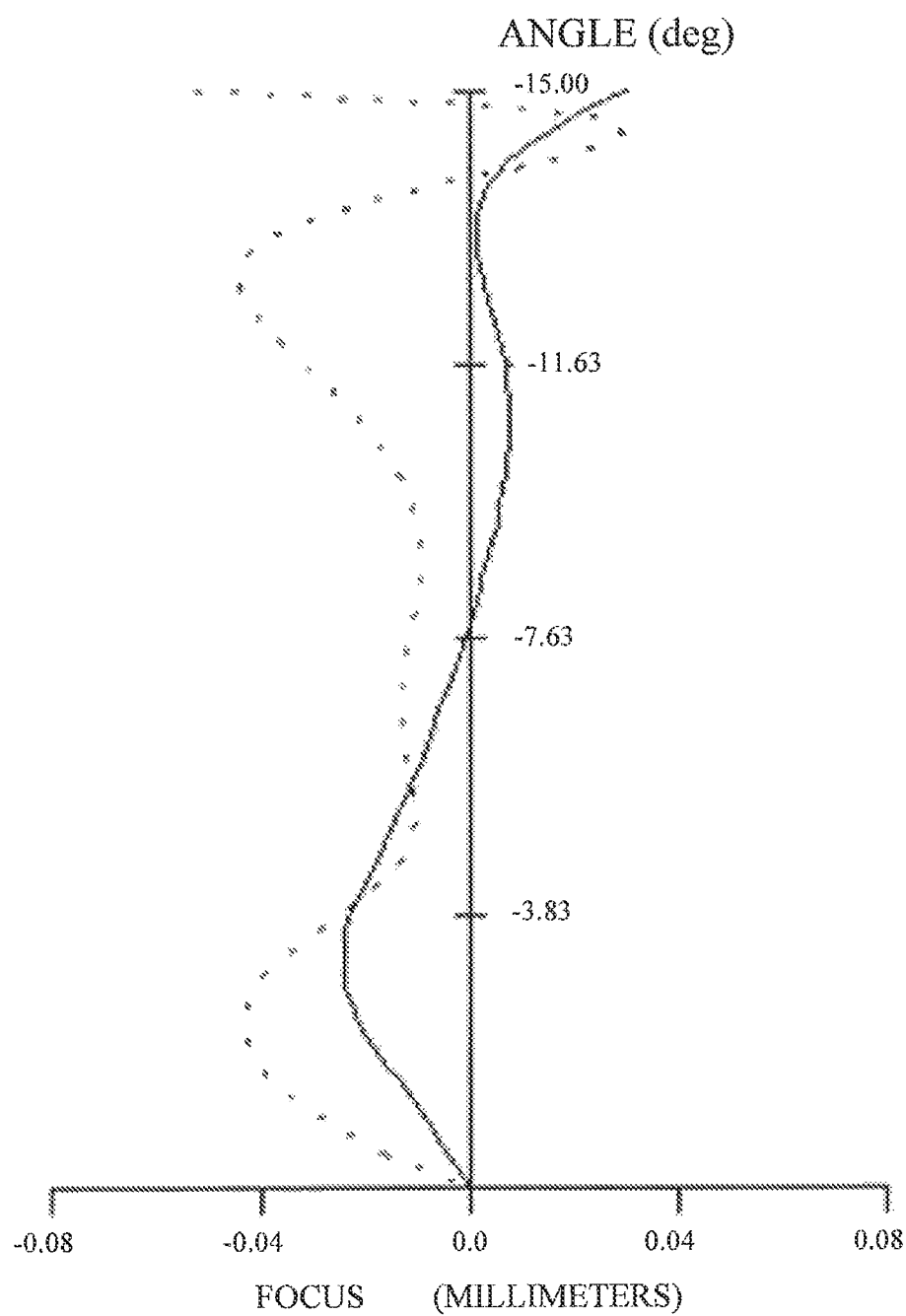
FIG. 4 shows curves of astigmatism and field curvature according to the embodiment of FIG. 2.
Figure 5:
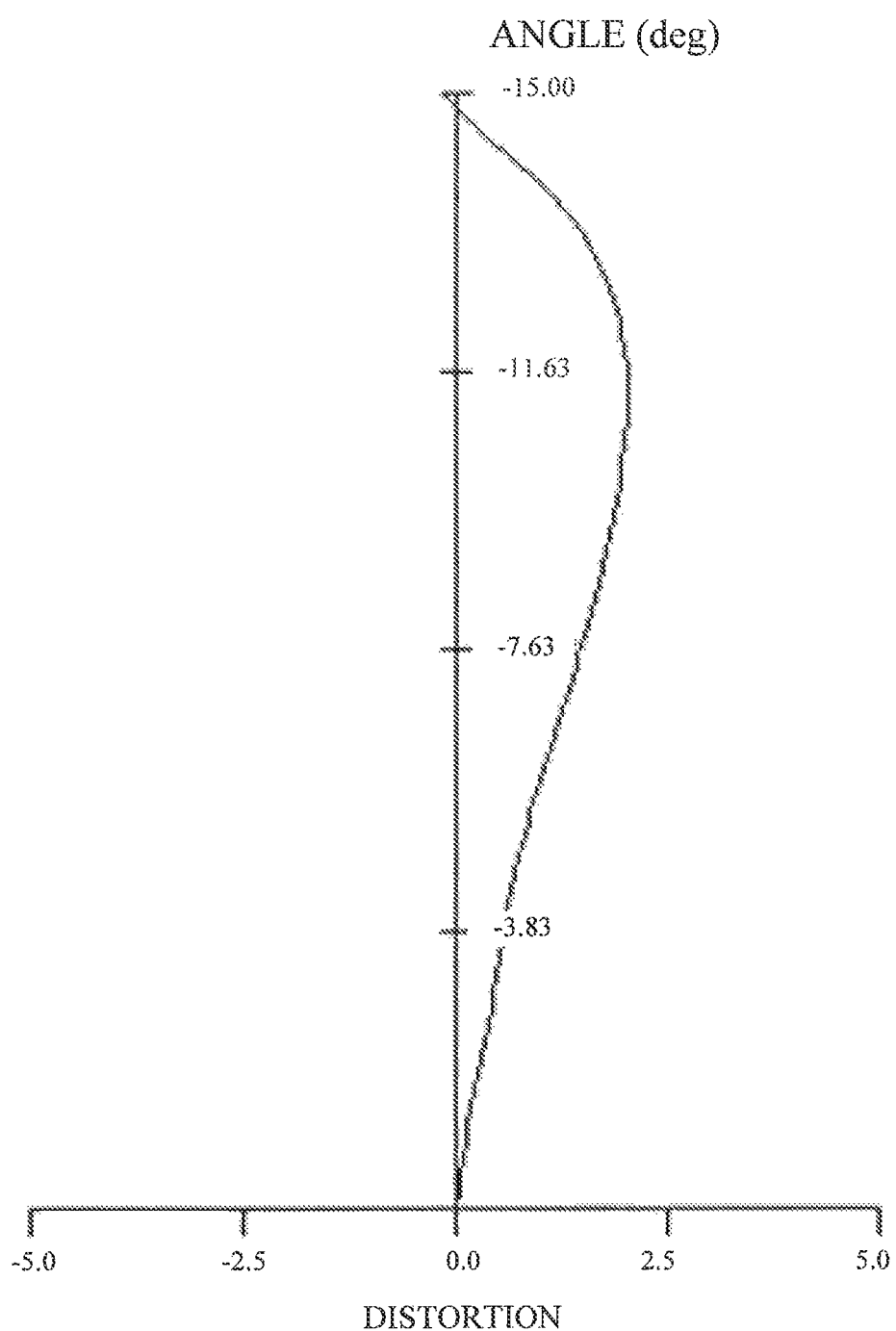
FIG. 5 shows a curve of distortion according to the embodiment of FIG. 2.

Portability and handiness of a wearable display device requires that the space of the wearable display device for hosting the optical module be comparatively decreased. According to the configuration of the optical module 113 of the illustrated embodiment of the present application, the optical module 113 provides a viewing angle reaching up to 40 degrees of good display quality with limited hosting space. As a preferred embodiment of the large viewing angle and high resolution, when the viewing angle of the optical module 113 is 30 degrees, as shown in the curves of modulation transfer function (MTF), astigmatism, field curvature and image distortion of FIG. 3 to FIG. 5, the full field of view is more than 0.6 at the position where the spatial frequency is 65 lp/mm. Note that the skilled person in the field can flexibly set the wearable display device to reach an optimal effect of the product, according to the configuration of the optical module, the product orientation, namely the required viewing angle and the required resolution.

Three sets of experiment data are as follows. Table 1 shows optical data of the display source F0, the exit pupil F12 and various optical elements of a first embodiment data, including surface types (Surface Type) of the optical surfaces (Surface), radiuses (Radius), distances on the optical axes of the optical surfaces (Thickness) and material (Material), wherein the material includes refractive index ($n_d$) and the dispersion coefficient ($v_d$), table 2 shows related parameters of the aspherical surfaces relevant to table 1.

TABLE 1

| Surface | Surface Type | Radius (mm) | Thickness (mm) | Material nd | vd |
|---|---|---|---|---|---|
| F0 | | infinite | | | |
| F1 | aspheric | −6.46 | 4.9 | 1.49 | 58 |
| F2 | aspheric | −6.703 | 2.28 | | |
| F3 | aspheric | 4.409 | 0.1 | 1.64 | 23 |
| F4 | aspheric | 1.912 | 2.03 | | |
| F5 | aspheric | 4.456 | 1.123 | 1.53 | 55 |
| F6 | aspheric | −43.463 | 4.296 | | |
| F7 | aspheric | 32.521 | 0.1 | 1.54 | 56 |
| F8 | | infinite | 8.683 | 1.54 | 56 |
| F9 | aspheric | −15.249 | 8.683 | 1.54 | 56 |
| F10 | | infinite | 0.1 | 1.51 | 64 |
| F11 | | infinite | 0.5 | | |
| F12 | | infinite | 18 | | |

TABLE 2

| Surface | K | A2 | A4 | A6 | A8 | A10 | A12 | A14 |
|---|---|---|---|---|---|---|---|---|
| F1 | −22.382380 | 0.00000 | −6.17517E−03 | 3.59102E−04 | −8.11389E−06 | 7.45363E−08 | 6.69739E−10 | −1.73438E−11 |
| F2 | −2.194040 | 0.00000 | −3.76305E−04 | 3.50307E−05 | 6.21368E−07 | −1.46816E−08 | −2.33027E−10 | 3.60272E−12 |
| F3 | −10.222000 | 0.00000 | −2.60700E−04 | −1.56000E−05 | 2.36100E−07 | 8.77100E−10 | −9.76800E−11 | −3.79000E−13 |
| F4 | −3.083000 | 0.00000 | −3.96200E−04 | 3.97100E−06 | 6.34700E−09 | −7.79700E−10 | 9.38500E−12 | −1.80200E−14 |
| F5 | −7.430000 | 0.00000 | 1.94800E−04 | −1.56400E−06 | −3.16200E−08 | 3.44600E−10 | −2.27600E−12 | 5.18800E−14 |
| F6 | 6.901000 | 0.00000 | −2.04900E−04 | 2.64100E−06 | −3.47000E−08 | −1.41700E−10 | −1.17500E−12 | 3.82900E−14 |
| F7 | 5.666000 | 0.00000 | −4.43500E−05 | 1.92600E−06 | −1.61200E−08 | 0.00000E+00 | 0.00000E+00 | 0.00000E+00 |
| F9 | −1.383000 | 0.00000 | 2.77000E−05 | −8.21300E−07 | 5.30900E−09 | 0.00000E+00 | 0.00000E+00 | 0.00000E+00 |

According to the data in table 1 and table 2 and the formula 1, it can be obtained that: f1=9f, f2=−0.4f, f3=0.41f, f4=1.1f.

Table 3 shows optical data of the optical surfaces (Surface) of a second embodiment data, table 4 shows related parameters of the aspherical surfaces relevant to table 3.

TABLE 3

| Surface | Surface Type | Radius (mm) | Thickness (mm) | Material nd | vd |
|---|---|---|---|---|---|
| F0 | | infinite | | | |
| F1 | spherical | −9.057 | 4 | 1.49 | 58 |
| F2 | spherical | −6.734 | 1.437 | | |
| F3 | aspheric | 26.262 | 0.078 | 1.64 | 23 |
| F4 | aspheric | 4.746 | 10.17 | | |
| F5 | aspheric | 17.63 | 2.5 | 1.53 | 55 |
| F6 | aspheric | −10.14 | 1.1 | | |
| F7 | aspheric | 27.51 | 0.5 | 1.54 | 56 |
| F8 | | infinite | 8.683 | 1.54 | 56 |
| F9 | aspheric | −18.296 | 8.683 | 1.54 | 56 |
| F10 | | infinite | 0.1 | 1.52 | 64 |
| F11 | | infinite | 0.5 | | |
| F12 | | infinite | 18 | | |

TABLE 4

| Surface | K | A2 | A4 | A6 | A8 | A10 | A12 | A14 |
|---|---|---|---|---|---|---|---|---|
| F3 | 1.494000 | 0.00000 | 2.02700E−04 | −8.52600E−06 | 1.36000E−07 | 1.02500E−09 | −3.17900E−11 | 1.03000E−13 |
| F4 | −2.697000 | 0.00000 | −2.21900E−04 | 5.26000E−06 | 3.42400E−06 | −1.06100E−09 | 7.30900E−12 | 3.52400E−15 |
| F5 | −19.847000 | 0.00000 | −1.70300E−03 | 1.87400E−05 | 3.74000E−07 | −5.82000E−09 | −4.23400E−10 | 6.96900E−12 |
| F6 | 0.790000 | 0.00000 | −8.51200E−04 | 2.03900E−06 | 2.78200E−07 | 4.21600E−09 | −2.35300E−10 | −4.94300E−12 |
| F7 | 2.53900E+15 | 0.00000 | 1.69200E−04 | 5.94400E−06 | −5.15900E−08 | 0.00000E+00 | 0.00000E+00 | 0.00000E+00 |
| F9 | 0.196000 | 0.00000 | 1.08200E−04 | −1.00700E−06 | −1.46700E−09 | 0.00000E+00 | 0.00000E+00 | 0.00000E+00 |

According to the data in table 3, table 4 and the formula 1, it can be obtained that: $f1=2.3f$, $f2=−0.58f$, $f3=0.64f$, $f4=1.2f$.

Table 5 shows optical data of the optical surfaces (Surface) of a third embodiment data, table 6 shows related parameters of the aspherical surfaces relevant to table 5.

TABLE 5

| Surface | Surface Type | Radius (mm) | Thickness (mm) | Material nd | vd |
|---|---|---|---|---|---|
| F0 | | infinite | | | |
| F1 | spherical | −15.363 | 4 | 1.85 | 23.8 |
| F2 | spherical | −13.068 | 6.11 | | |
| F3 | aspheric | 21.551 | 0.1 | 1.92 | 18.9 |
| F4 | aspheric | 6.315 | 6.379 | | |
| F5 | spherical | −49.886 | 0.1 | 1.46 | 90 |
| F6 | aspheric | −22.183 | 5.215 | | |
| F7 | aspheric | 9.238 | 0.1 | 1.5 | 62 |
| F8 | | infinite | 8.683 | 1.5 | 62 |
| F9 | aspheric | −14.668 | 8.683 | 1.5 | 62 |
| F10 | | infinite | 0.1 | 1.52 | 64 |
| F11 | | infinite | 0.5 | | |
| F12 | | infinite | 18 | | |

TABLE 6

| Surface | K | A2 | A4 | A6 | A8 | A10 | A12 | A14 |
|---|---|---|---|---|---|---|---|---|
| F3 | −12.840000 | 0.00000 | −2.17400E−04 | −3.37500E−06 | 1.10200E−07 | −4.18400E−10 | −3.23300E−11 | 4.33700E−13 |
| F4 | −2.974000 | 0.00000 | −3.30600E−04 | 4.11700E−06 | 8.58700E−09 | −6.80600E−10 | 1.50800E−11 | 1.91100E−14 |
| F6 | 1.47300E+17 | 0.00000 | −8.39600E−05 | 9.79300E−07 | −1.76400E−08 | −7.68600E−10 | −1.01700E−11 | 2.48300E−13 |
| F7 | −4.139000 | 0.00000 | −6.98000E−05 | −6.06000E−08 | −1.52500E−08 | 0.00000E+00 | 0.00000E+00 | 0.00000E+00 |
| F9 | −1.647000 | 0.00000 | 5.22600E−05 | −1.13900E−07 | 3.72600E−09 | 0.00000E+00 | 0.00000E+00 | 0.00000E+00 |

According to the data in table 5, table 6 and the formula 1, it can be obtained that: $f1=2.43f$, $f2=−0.63f$, $f3=4.3f$, and $f4=0.77f$.

In the illustrated embodiment, an angle between incident light to the reflection surface F8 and the reflected light from the reflection surface F8, i.e., a reflection angle of the reflection surface F8 is 90 degrees, and the light is in a single reflection on the reflection surface F8. But the present application is not limited to that, that is to say, the reflection angle can be set to be in a range such as from 75 degrees to 105 degrees, according to the space defined by the structure and configuration of the wearable display device. The reflection surface can make the components in the display device more compact, thereby making the display device much smaller. According to the structure and principle of the optical module of the present application, any reasonable change made by the skilled person in the field without creative work, still belongs to the protective scope of the present application.

Preferably, the two sets of optical modules 113 can respectively define a certain angle θ relative to the central axis X. As illustrated by FIG. 6, a light transmitting direction of the first optical unit 113A is defined as a first direction D1, a light transmitting direction which is reflected by the reflection surface F8 is defined as a second direction D2, an angle between the second direction D2 and the central axis X is θ. In this embodiment, the second direction D2 is the light exiting direction of the optical module 113, that is to say, an angle between the light exiting direction of the optical module 113 and the center axis X is also θ. This configuration can effectively solve the non-coincidence of the virtual images seen by two eyes of the user because of individual differences between the users. Preferably, the angle is in a range from 0-9 degrees. It needs to be sure that, the illustrated angle is only as an example, not limiting specific angles and directions.

It needs to be sure that, the wearable display device 10 is not limited to the specific structure in the illustrated embodiment, the wearable display device 10 can include one set of optical module of any aforesaid embodiment, correspondingly, the miniature display module includes one miniature display, thereby forming a wearable display device for one eye. The wearable display device can include two sets of optical modules, the miniature display module includes one miniature display configured to provide a display source to the two sets of optical modules. For example, the miniature display can be positioned between the two sets of optical modules, and project the display source to the first optical units of the two sets of optical modules, the second optical units of the two sets optical modules change the optical path to the direction of the exit pupils, according to the virtual images provided by the first optical units.

Figure 7:
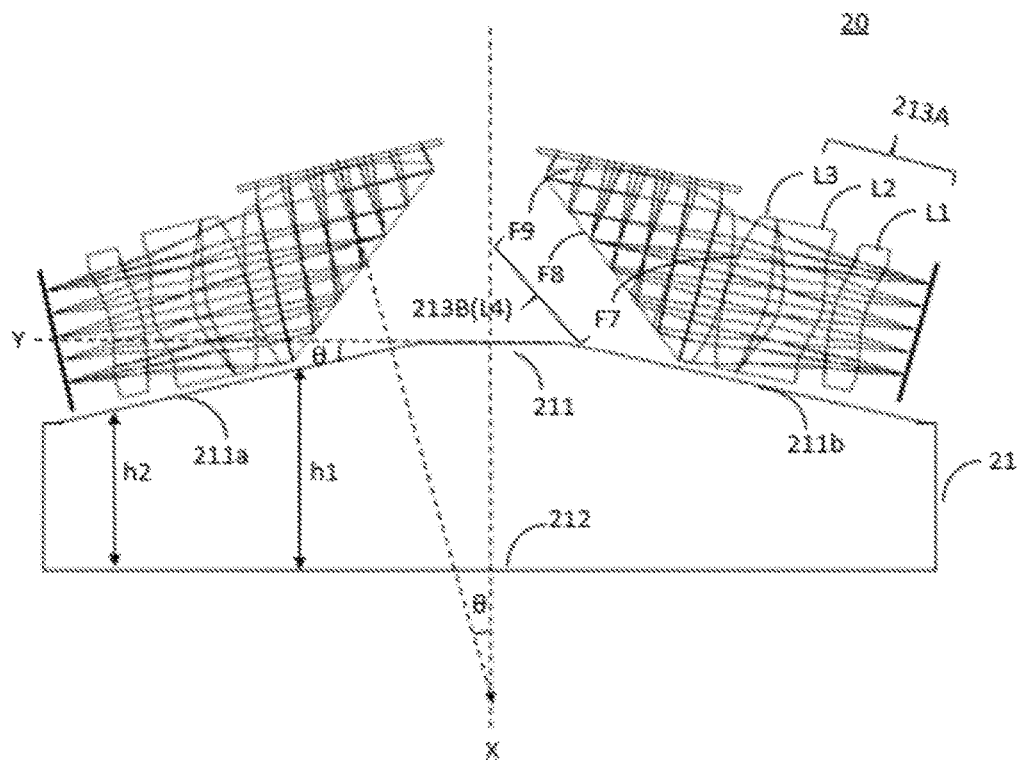
FIG. 7 is a diagrammatic view of an optical device in accordance with an embodiment of the present application.

Referring to FIG. 7, based on the principle description for the optical module in the aforesaid embodiments, the present application further provides an optical device 20 of an additional embodiment, which includes two sets of optical modules 213. Specifically, a first optical unit 213A of each set of optical module 213 includes a first lens L1 having a positive focal length, a second lens L2 having a negative focal length, a third lens L3 having a positive focal length, and a second optical unit 213B includes a fourth optical element L4 which includes a first aspheric surface F7, a second aspheric surface F9 and a reflection surface F8, the reflection surface F8 is configured to change a direction of an optical path of the first optical unit 213A to a direction of the exit pupil. The first lens L1, the second lens L2 and the third lens L3 are sequentially arranged along an optical path of the first optical unit and away from the display source. In the illustrated embodiment, the optical device 20 further includes a first base 21 which includes a supporting side 211 configured to secure the two optical modules 213. The two optical modules 213 are symmetrical to each other relative to a central axis X of the supporting side 211. The first lens L1, the second lens L2, the third lens L3, the fourth optical element L4 of the two sets of optical modules 213 are sequentially secured on the first base 21 along directions from two ends of the supporting side 211 towards the central axis X. Specifically, the supporting side 211 includes a first supporting side 211a and a second supporting side 211b respectively configured to secure the two sets of optical modules 213. The first supporting side 211a and the second supporting side 211b respectively define an angle θ relative to a horizontal axis Y perpendicular to the central axis X. The included angle θ can be obtained by designing the structure of the first base 21. For example, the first base 21 further includes a bottom side 212 opposite to the supporting side 211, a vertical height is defined between the supporting side 211 and the bottom side 212, a vertical height h1 at one end of each of the first supporting side 211a and the second supporting side 211b adjacent to the corresponding fourth optical elements L4 is larger than a vertical height h2 at an opposite end of each of the first supporting side 211a and the second supporting side 211b adjacent to the corresponding first lenses L1, whereby the first supporting side 211a and the second supporting side 211b respectively define the angle θ relative to the horizontal axis Y perpendicular to the central axis X, thus, the optical device 20 realizes the optical angle θ defined between the light exiting direction and the central axis X through the first supporting side 211a and the second supporting side 211b of the first base 21. In the illustrated embodiment, the bottom side 212 is a bottom face parallel to the horizontal axis Y. In at least one alternative embodiment, the first base 21 may have no bottom side 212, or have a bottom side 212 with any configuration and shape, so long as that each of the first supporting side 211a and the second supporting side 211b defines the angle θ relative to the horizontal axis Y.

It can be understood that, in at least one alternative embodiment, in order to realize the angle θ between the light exiting direction of the optical module 113 and the central axis X, the first base 21 can be omitted, and the angle θ can be realized by changing the reflection angle of the reflection surface F8. For example, the two first directions D1 of the two first optical units 113A are overlapped, the reflection angle of the reflection surface F8 is 90 degrees subtracting the angle θ. Here, it can be realized that the light exiting direction and the central axis x define the angle θ therebetween.

Figure 8:
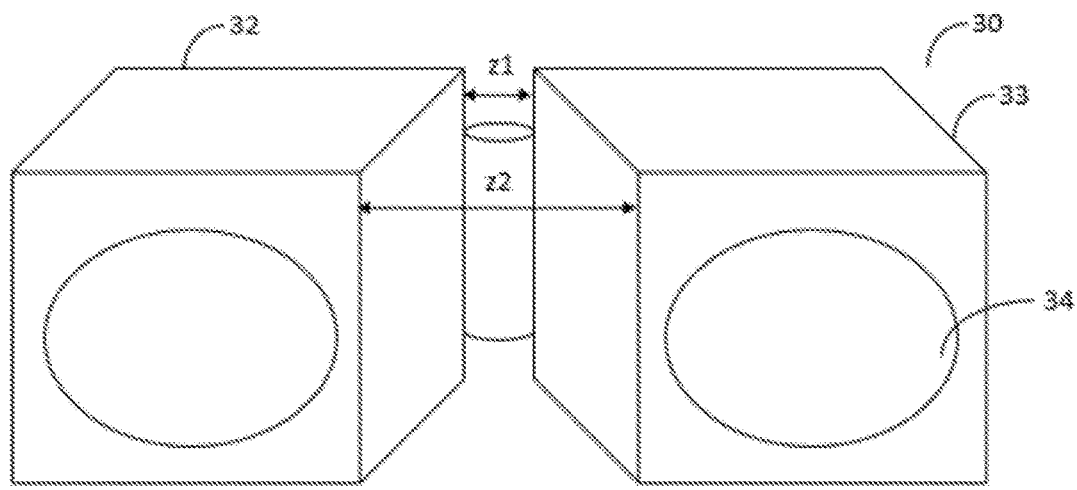
FIG. 8 is a diagrammatic view of an optical device in accordance with an alternative embodiment of the present application.
Figure 9:
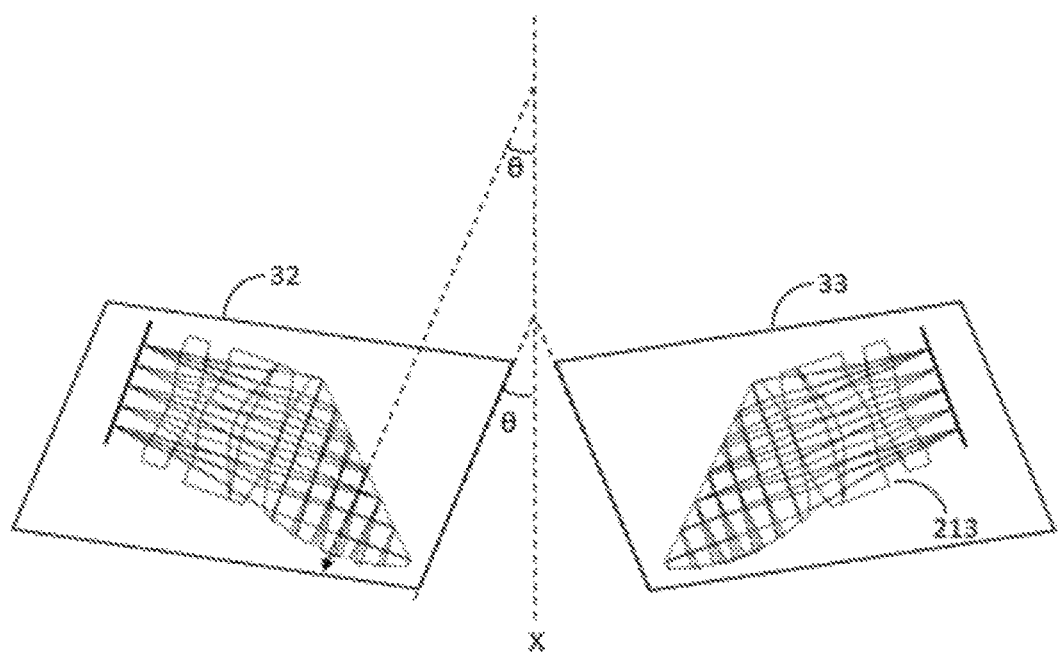
FIG. 9 is a cross-sectional diagrammatic view of the optical device shown in FIG. 8.

In an alternative embodiment, as illustrated by FIG. 8 and FIG. 9, the optical device 30 includes a second base 32 and a third base 33 respectively for securing a respective one set of optical module 213. The second base 32 and the third base 33 are symmetrical to each other relative to a central axis X, the light exiting direction of the optical module 213 secured by each of the second base 32 and the third base 33 defines an angle relative to the central axis X. Specifically, each of the second base 32 and the third base 33 includes a light viewing window 34 configured to project the virtual images magnified by the optical module 213 from the display source to the exit pupil. The second base 32 has one end thereof, adjacent to the corresponding fourth optical element L4, connected to one end of the third base 33 adjacent to the corresponding fourth optical element L4, so that each of the second base 32 and the third base 33 defines an angle θ relative to the central axis X, that is to say, the second base 32 and the third base 33 define an angle 2θ therebetween. A horizontal distance z2 between two sides of the second base 32 and the third base 33 having the light viewing window 34, is larger than a horizontal distance z1 between two sides of the second base 32 and the third base 33 opposite to the light viewing window 34, that is to say, the horizontal distance z2 between two light emergent sides of the second base 32 and the third base 33 is larger than the horizontal distance z1 between two sides opposite to the two light viewing sides of the second base 32 and the third base 33. In the illustrated embodiment, the optical device 30 realizes the optical angle θ between the light exiting direction of each of the two sets of optical modules 213 and the central axis X, via the angle 2θ between the second base 32 and the third base 33.

It is can be understood, the wearable display device of the present application, includes the miniature display module providing the display source, combining with the optical module of any of the above embodiments, which is configured to project the magnified virtual image of the display source to the exit pupil.

The above description is only preferred embodiments of the present application, not limiting the present application, any modification, equivalent replacement and improvement, etc., within the spirits and principles of the present application shall be included in the protective scope of the present application.

What is claimed is:
1. A wearable display device comprising:
a miniature display module, configured to output a display source;
an optical module, configured to magnify the display source and project the display source to an exit pupil, the optical module comprising:
a first optical unit, comprising a first lens having a positive focal length, a second lens having a negative focal length, and a third lens having a positive focal length, the first lens, the second lens and the third lens are sequentially arranged along an optical path of the first optical unit and away from the display source; and
a second optical unit, comprising a fourth optical element having a positive focal length, the fourth optical element comprising a first aspheric surface, a second aspheric surface and a reflection surface, the reflection surface changing a direction of an optical path of the first optical unit towards the exit pupil.

2. The wearable display device as claimed in claim 1, wherein the first lens is adjacent to the display source, and the second lens, the third lens and the fourth optical element are sequentially arranged along the optical path and away from the display source.

3. The wearable display device as claimed in claim 1, wherein the first optical unit comprises at least three aspheric surfaces.

4. The wearable display device as claimed in claim 1, wherein the first aspheric surface of the fourth optical element faces the third lens, and the second aspheric surface of the fourth optical element faces the exit pupil.

5. The wearable display device as claimed in claim 1, wherein the second lens has a dispersion coefficient less than a dispersion coefficient of each of the third lens and the fourth optical element, eliminating a lateral chromatic aberration.

6. The wearable display device as claimed in claim 1, wherein the fourth optical element is an integrally made prism comprising the first aspheric surface, the second aspheric surface and the reflection surface.

7. The wearable display device as claimed in claim 1, wherein the fourth optical element comprises a lens having the first aspheric surface, another lens having the second aspheric surface and a reflector having the reflection surface.

8. The wearable display device as claimed in claim 1, wherein the reflection surface has a reflection angle in a range from 75 degrees to 105 degrees.

9. The wearable display device as claimed in claim 1, wherein the reflection surface has a reflection angle of 90 degrees.

10. The wearable display device as claimed in claim 1, wherein light has a single reflection on the reflection surface.

11. The wearable display device as claimed in claim 1, wherein the optical module defines an optical axis, the first lens, the second lens, the third lens and the fourth optical element each having a plurality of optical surfaces and an optical center, the optical surfaces being rotationally symmetric relative to the optical axis, the optical centers are coaxial on the optical axis.

12. The wearable display device as claimed in claim 1, wherein the optical module has a focal length f, the first lens has a focal length f1, the second lens has a focal length f2, the third lens has a focal length f3, and wherein:

$$2f < f1 < 12f,$$

$$-1.1f < f2 \leq -0.4f,$$

$$0.4f < f3 < 4.5f.$$

13. The wearable display device as claimed in claim 12, wherein the fourth optical element has a focal length f4, and wherein:

$$0.7f < f4 < 1.5f.$$

14. The wearable display device as claimed in claim 12, wherein an optical path length O from the display source, through the optical module to the exit pupil, comprises a first distance O1 from the display source through the optical module to the reflection surface, and a second distance O2 from the reflection surface to the exit pupil, and wherein:

$$0.8f < O1 < 1.6f,$$

$$0.6f < O2 < 1.8f, \text{ and}$$

$$1.2f < O < 3.4f.$$

15. The wearable display device as claimed in claim 1, wherein the optical module has a viewing angle ω less than 40 degrees.

16. The wearable display device as claimed in claim 1, wherein the second optical unit has a protecting lens arranged at a light exiting side of the second optical unit.

17. The wearable display device as claimed in claim 1, wherein the miniature display module comprises two miniature displays, the wearable display device comprises two sets of the optical modules respectively magnifying the display sources of the two miniature displays and correcting aberration of the display sources.

18. The wearable display device as claimed in claim 17, wherein the two sets of optical modules are symmetric to each other about a central axis, and a light exiting direction of each of the optical modules defines an angle relative to the central axis.

19. The wearable display device as claimed in claim 18, wherein the angle is in a range from 0-9 degrees.

20. An optical device comprising two sets of optical modules and a first base,
the first base comprising a supporting side securing the two sets of optical modules, wherein the two sets of optical modules are symmetrically arranged relative to a central axis of the supporting side; and
the two sets of optical modules comprising:
a first optical unit, comprising a first lens having a positive focal length, a second lens having a negative focal length, and a third lens having a positive focal length, the first lens, the second lens and the third lens being sequentially arranged along an optical path of the first optical unit; and
a second optical unit, comprising a fourth optical element having a positive focal length, the fourth optical element comprising a first aspheric surface, a second aspheric surface and a reflection surface, the reflection surface changing a direction of the optical path of the first optical unit towards an exit pupil.

21. The optical device of as claimed in claim 20, wherein the first optical unit comprises three or more than three aspheric surfaces.

22. The optical device of as claimed in claim 20, wherein the first lenses, the second lenses, the third lenses and the fourth optical elements of the two sets of optical modules are sequentially secured on the first base along directions from two ends of the supporting side towards the central axis, respectively.

23. The optical device of as claimed in claim 22, wherein the supporting side comprises a first supporting side and a second supporting side respectively for securing the two sets of optical modules, the first supporting side and the second supporting side respectively defining an angle relative to a horizontal axis perpendicular to the central axis.

24. The optical device of as claimed in claim 23, wherein the first base comprises a bottom side opposite to the supporting side, the supporting side and the bottom side defining a vertical height therebetween, the vertical height at one end of each of the first supporting side and the second supporting side adjacent to a corresponding fourth optical element being larger than the vertical height at an opposite end of each of the first supporting side and the second supporting side adjacent to a corresponding first lens.

25. An optical device comprising two sets of optical modules, the optical modules comprising:
a first optical unit, comprising a first lens having a positive focal length, a second lens having a negative focal length, and a third lens having a positive focal length, the first lens, the second lens and the third lens being sequentially arranged along an optical path of the first optical unit;
a second optical unit, comprising a fourth optical element having a positive focal length, the fourth optical element comprising a first aspheric surface, a second aspheric surface and a reflection surface, the reflection surface changing a direction of the optical path of the first optical unit towards an exit pupil; and
a first base and a second base each securing one set of optical modules, the second base and the third base being symmetrically arranged relative to a central axis, and the optical modules, respectively secured by the first base and the second base, each having a light exiting direction defining an angle relative to the central axis.

26. The optical device of as claimed in claim 25, wherein the second base has one end therefore, which is adjacent to a corresponding fourth optical element, connected to one end of the third base adjacent to a corresponding fourth optical element, the third base and the second base respectively defining the angle relative to the central axis.

27. The optical device of as claimed in claim 23 wherein the angle is in a range from 0-9 degrees.

28. A wearable display device comprising: the optical device recited in claim 20 and a miniature display module;
the miniature display module configured to provide a display source; and
the optical module of the optical device configured to project magnified virtual images of the display source to the exit pupil.

* * * * *